United States Patent [19]

Hall

[11] Patent Number: 4,568,292
[45] Date of Patent: Feb. 4, 1986

[54] HYDRAULIC ASSISTANCE DEVICE FOR USE IN A STEERING SYSTEM

[75] Inventor: Charles B. Hall, Ingleside, Ill.

[73] Assignee: Outboard Marine Corporation, Waukegan, Ill.

[21] Appl. No.: 558,041

[22] Filed: Dec. 5, 1983

[51] Int. Cl.⁴ .......................................... B63H 21/26
[52] U.S. Cl. ........................................ 440/61; 440/53
[58] Field of Search ............................ 440/61, 53, 49; 114/150; 91/420, 380, 368, 460; 60/547.1, 551, 555, 591

[56] References Cited

U.S. PATENT DOCUMENTS

| 2,020,951 | 11/1935 | Lemon | 60/52 |
| 2,974,491 | 3/1961 | Cassaday et al. | 60/52 |
| 3,182,629 | 5/1965 | Armantrout | 440/61 |
| 3,631,833 | 1/1972 | Shimanckas | 440/61 |
| 3,799,104 | 3/1974 | Kurling | 440/61 |
| 3,885,517 | 5/1975 | Borst | 440/61 |
| 4,373,920 | 2/1983 | Hall et al. | 440/59 |

Primary Examiner—Trygve M. Blix
Assistant Examiner—C. T. Bartz
Attorney, Agent, or Firm—Michael, Best & Friedrich

[57] ABSTRACT

A steering system including a first member, and a second member movable relative to the first member, and a hydraulic assistance device comprising a valve portion including a first valve port, and a second valve port. The valve portion communicates with a fluid pressure source and a hydraulic cylinder assembly, and is connected to the first member and movable in response to movement of the first member relative to the second member for selectively supplying fluid from the fluid pressure source to the second valve port and for transmitting fluid to the hydraulic cylinder assembly from the first valve port in response to movement of the first member in one direction relative to the second member, and for supplying fluid from the fluid pressure source to the first valve port and for transmitting fluid to the hydraulic cylinder assembly from the second valve port in response to movement of the second member in the opposite direction relative to the first member. The hydraulic assistance device further includes a slave hydraulic cylinder assembly communicating with the first valve port and the second valve port, connected to the second member, and movable in response to movement of the first member relative to the second member for supplying fluid to the first valve port and receiving fluid from the second valve port in response to movement of the first member in the one direction relative to the second member, and for supplying fluid to the second valve port and receiving fluid from the first valve port in response to movement of the first member in the opposite direction relative to the second member.

15 Claims, 4 Drawing Figures

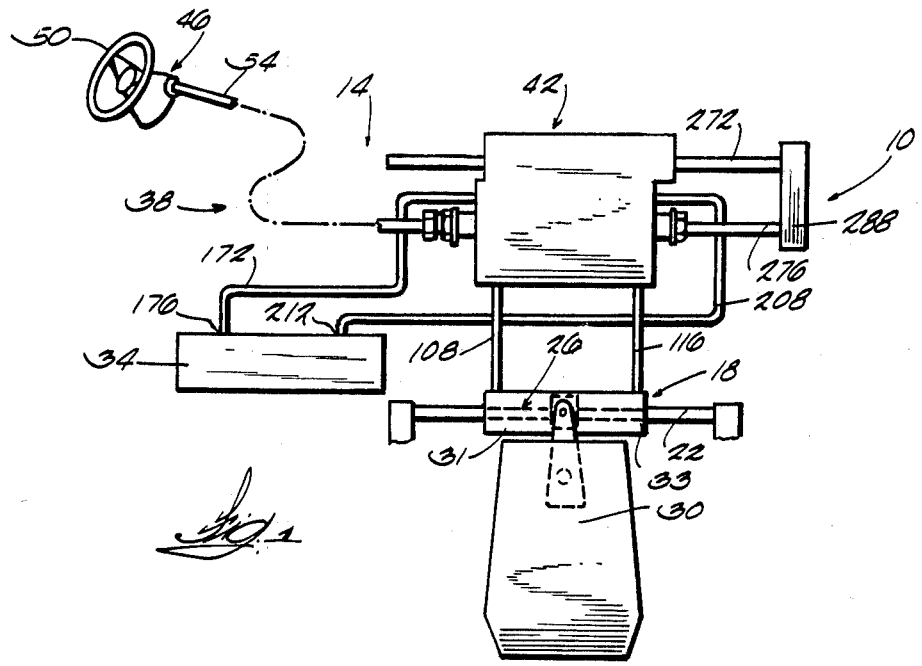
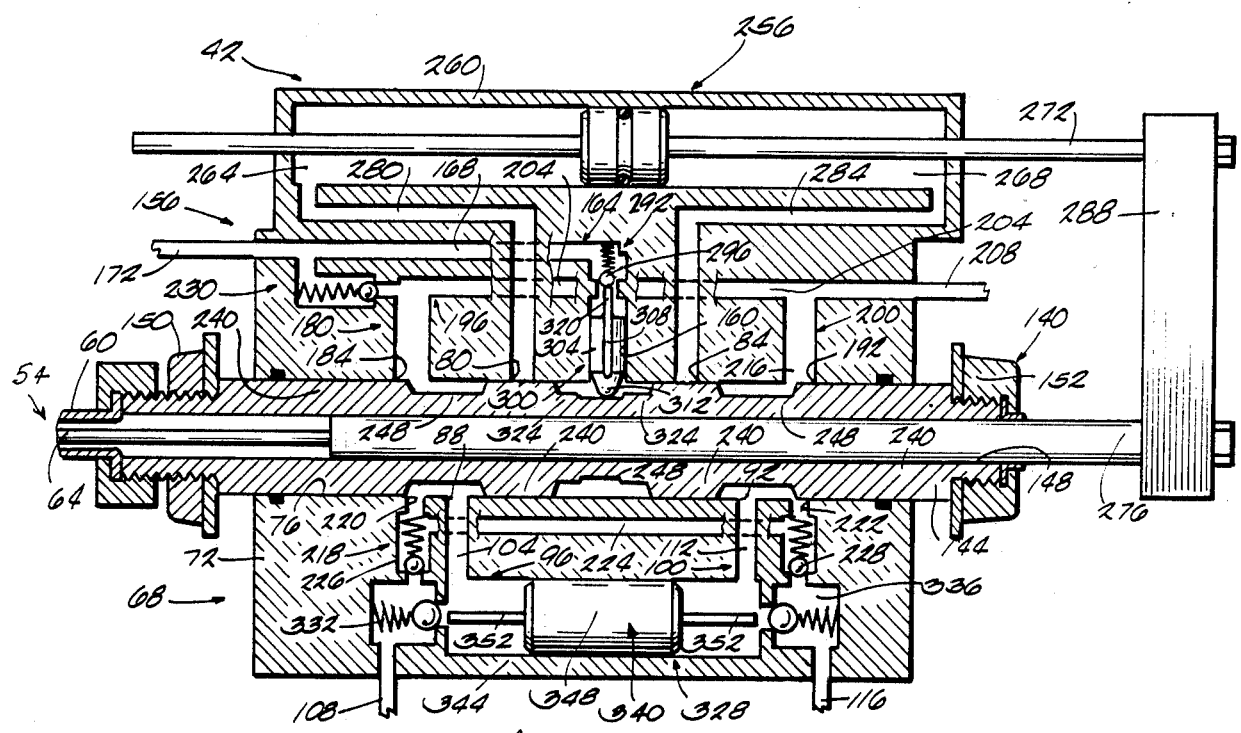

HYDRAULIC ASSISTANCE DEVICE FOR USE IN A STEERING SYSTEM

BACKGROUND OF THE INVENTION

This invention relates to hydraulic assistance devices for use in steering systems and, more particularly, to such steering systems which include a hydraulic cylinder assembly, a first member and a second member movable relative to the first member, and hydraulic assistance devices for providing hydraulic assistance to the hydraulic cylinder assembly in response to movement of the first member relative to the second member.

Attention is direct to U.S. Pat. No. 2,020,951, Lemon, issued Nov. 12, 1935, and U.S. Pat. No. 2,974,491, Cassaday et al. issued Apr. 4, 1960, which disclose steering systems with hydraulic assistance. U.S. Pat. No. 4,373,920, Hall et al. issued Feb. 15, 1983, is hereinafter incorporated herein by reference.

SUMMARY OF THE INVENTION

This invention provides a hydraulic assistance device for use in a steering system including a source of fluid under pressure, hydraulic steering means, a first member, and a second member movable relative to the first member. The device comprises valve means including a first valve port, and a second valve port. The valve means is adapted to communicate with the fluid pressure source and the hydraulic steering means, and is adapted to be connected to the first member, and is movable in response to movement of the first member relative to the second member for selectively supplying fluid from the fluid pressure source to the second valve port and for transmitting fluid to the hydraulic steering means from the first valve port in response to movement of the first member in one direction relative to the second member, and for supplying fluid from the fluid pressure source to the first valve port and for transmitting fluid to the hydraulic steering means from the second valve port in response to movement of the second member in the opposite direction relative to the first member. The device also includes slave means communicating with the first valve port and the second valve port. The slave means is adapted to be connected to the second member, and movable in response to the first member relative to the second member for supplying fluid to the first valve port and for receiving fluid from the second valve port in response to movement of the first member in the one direction relative to the second member, and for supplying fluid to the second valve port and for receiving fluid from the first valve port in response to movement of the first member in the opposite direction relative to the second member.

The invention also provides a steering system including a source of fluid under pressure, a hydraulic cylinder assembly including a hydraulic cylinder, and a piston rod slidably received in the cylinder. The system also includes operator actuating means for moving the piston rod relative to the cylinder in response to operator actuation. The moving means includes a first member, and a second member movable relative to the first member in response to operator actuation. The system further includes means for providing hydraulic assistance to the operator actuating means, the assistance means comprising valve means including a first valve port, and a second valve port. The valve means communicates with the fluid pressure source and the hydraulic cylinder assembly, and is connected to the first member and movable in response to movement of the first member relative to the second member for selectively supplying fluid from the fluid pressure source to the second valve port and for transmitting fluid to the hydraulic cylinder assembly from the valve first valve port in response to movement of the first member in one direction relative to the second member, and for supplying fluid from the fluid pressure source to the first valve port and for transmitting fluid to the hydraulic cylinder assembly from the second valve port in response to movement of the second member in the opposite direction relative to the first member. The assistance means further includes slave means communicating with the first valve port and the second valve port, connected to the second member and movable in response to movement of the first member relative to the second member for supplying fluid to the first valve port and receiving fluid from the second valve port in response to movement of the first member in the one direction relative to the second member, and for supplying fluid to the second valve port and receiving fluid from the first valve port in response to movement of the first member in the opposite direction relative to the second member.

One of the principal features of this invention is the provision of a steering system including a hydraulic assistance device which is less sensitive to porting and spool valve fit tolerances than previous hydraulic assistance devices.

Another of the principal features of this invention is to provide such a steering system which has the advantages of a hydraulic steering cylinder but which can be used in combination with a mechanical push-pull cable helm.

Another of the principal features of this invention is to provide such a hydraulic assistance device which can operate in the event of the failure of a power assistance pump supplying fluid to the hydraulic assistance device.

Other features and advantages of embodiments of the invention will become apparent upon reviewing the following drawings, the detailed description and the appended claims.

BRIEF DESCRIPTION OF THE DRAWINGS

FIG. 1 is a schematic view of a marine propulsion installation including a steering system including a hydraulic assistance device which embodies various of the features of the invention.

FIG. 2 is a diagramatic view of the hydraulic assistance device shown in FIG. 1.

Figure 3:
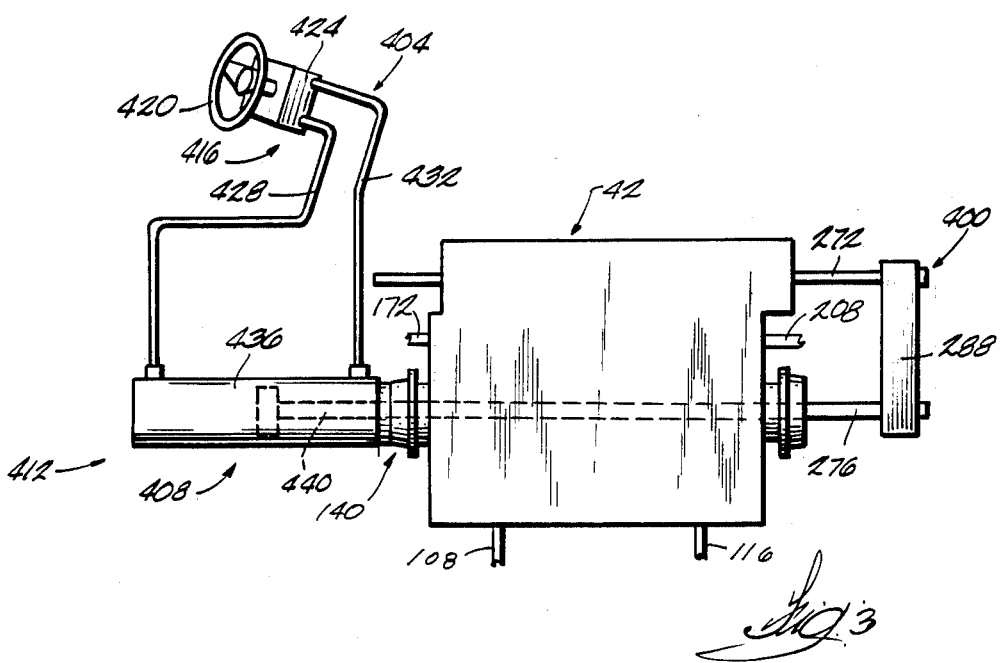
FIG. 3 is a schematic view of part of a marine propulsion installation including a steering system including a hydraulic assistance device which embodies various of the features of the invention.

Before explaining at least one embodiment of the invention in detail, it is to be understood that the invention is not limited in its application to the details of construction and the arrangements of components set forth in the following description or illustrated in the drawings. The invention is capable of other embodiments and of being practiced or carried out in various ways. Also it is to be understood that the phraseology and terminology employed herein is for the purposes of description and should not be regarded as limiting.

DESCRIPTION OF THE PREFERRED EMBODIMENTS

As illustrated in the drawings, embodiments of this invention will be described in combination with a marine propulsion installation 10. Although described in this manner, the invention can be used in other applications utilizing steering systems including hydraulic steering means such as a hydraulic cylinder assembly.

As illustrated in FIG. 1, the marine propulsion installation 10 comprises a steering system 14 which includes hydraulic steering means in the form of a hydraulic cylinder assembly 18 including a piston rod 22 slidably received in a cylinder 26. The cylinder assembly 18 is connected to a steerable outboard motor 30 which is steerable in response to movement of the cylinder 26 relative to the piston rod 22. The cylinder assembly 18 pivots the outboard motor 30 in one direction in response to fluid pressure at a first end 31 of the hydraulic cylinder 26, and pivots the outboard motor 30 in the opposite direction in response to fluid under pressure at a second end 33 of the hydraulic cylinder 26.

The connection of the cylinder assembly 18 to the steerable outboard motor 30 is more fully described in U.S. Pat. No. 4,373,920, Hall et al. issued Feb. 15, 1983, which is incorporated herein by reference.

The steering system 14 also includes a source of fluid under pressure 34 which normally includes a pump and can include an accumulator (not shown). The steering system 14 also includes operator actuating means 38 for moving the cylinder 26 relative to the piston rod 22 in response to operator actuation, and means for providing hydraulic assistance from the fluid pressure source 34 to the operator actuating means 38 in the form of a device 42 which is connected between the operator actuating means 38, the fluid pressure source 34, and the hydraulic cylinder assembly 18.

While other constructions can be employed in other embodiments, the operator actuating means 38 comprises a helm 46 including a steering wheel 50 operably connected to a mechanical push-pull cable 54. As illustrated in FIG. 2, the push-pull cable 54 includes a first member or sheath 60 slidably receiving a second member or core 64, and rotation of the steering wheel 50 in one direction moves the core 64 in one direction relative to the sheath 60, and the opposite rotation of the steering wheel 50 moves the core 64 in the opposite direction relative to the sheath 60.

As illustrated in FIG. 2, the hydraulic assistance device 42 includes valve means 68 which comprises a valve housing 72 with a bore 76 which extends completely therethrough and which communicates with a first valve port 80, a second valve port 84, a first cylinder port 88 in the area adjacent the first valve port 80 and outside of the area between the first valve port 80 and the second valve port 84, and a second cylinder port 92 in the area adjacent the second valve port 84, and outside of the area between the first valve port 80 and second valve port 84. The valve means 68 also includes first cylinder conduit means 96 for communicating the first cylinder port 88 with the first end 31 of the hydraulic cylinder assembly 18, and second cylinder conduit means 100 for communicating the second cylinder port 92 with the second end 33 of the hydraulic cylinder assembly 18.

More particularly, the first cylinder conduit means 96 includes a first cylinder branch 104 communicating with the first cylinder port 88, and a first conduit 108 communicating with the first cylinder branch 104 and the first end 31 of the hydraulic cylinder assembly 18. The second cylinder conduit means 100 includes a second cylinder branch 112 communicating with the second cylinder port 92, and a second conduit 116 communicating with the second cylinder branch 112 and the second end 33 of the hydraulic cylinder 18.

The valve means 68 also includes supply means 156 for communicating fluid from the fluid pressure source 34 with the first valve port 80 and the second valve port 84. More particularly, while other constructions can be employed in other embodiments, the supply means 156 comprises a supply port 160 communicating with the housing bore 76 in the area between the first valve port 80 and the second valve port 84, and supply conduit means 164 for supplying fluid to the supply port 160 from the fluid pressure source 34. More particularly, the supply conduit means 164 comprises a supply conduit branch 168 communicating with the supply port 160, and a conduit 172 communicating with the supply conduit branch 168 and an outlet 176 from the fluid pressure source 34.

The valve means 68 further includes a switch valve 140 slidably received in the bore 76, connected to the sheath 60, and movable in response to movement of the sheath 60 relative to the core 64 for selectively supplying fluid from the supply means 156 to the second valve port 84 and for transmitting fluid to the hydraulic cylinder assembly 18 from the first valve port 80 in response to movement of the sheath 60 in one direction relative to the core 64, and for supplying fluid from the supply means 156 to the first valve port 80 and for transmitting fluid to the hydraulic cylinder assembly 18 from the second valve port 84 in response to movement of the sheath 60 in the opposite direction relative to the core 64.

More particularly, in the embodiment illustrated in FIG. 2, the switch valve 140 comprises a sleeve 144 including a central bore 148 extending along the longitudinal axis thereof. The switch valve 140 also includes means for limiting the amount of movement of the switch valve sleeve 144 relative to the valve housing 72 in the form of stops 150 and 152 which are on each end of the sleeve 144, and which are spaced apart from the outside of the valve housing 72.

The hydraulic assistance device 42 further includes means 180 for returning fluid from the hydraulic cylinder assembly 18 to the fluid pressure source 34 in response to movement of the sheath 60 relative to the core 64. More particularly, the returning means 180 includes the switch valve 140, a first return port 184 in communication with the housing bore 76, adjacent the first cylinder port 88 and outside of the area between the first cylinder port 88 and the second cylinder port 92, and a second return port 192 in communication with the housing bore 76, adjacent the second cylinder port 92 and outside of the area between the first cylinder port 88 and the second cylinder port 92. The returning means 180 also includes first return conduit means 196 for returning fluid from the first return port 184 to the fluid pressure source 34, and second return conduit means 200 for returning fluid from the second return port 192 to the fluid pressure source 34.

More particularly, while other constructions can be employed in other embodiments, the first return conduit means 196 comprises a first return branch 204 communicating with the first return port 184, and a conduit 208 communicating with the first return branch 204 and an inlet 212 into the fluid pressure source 34. The second return conduit means 200 comprises a second return branch 216 communicating the second return port 192 with the first return branch 204.

The hydraulic assistance device 42 also includes means 218 providing for pressure relief in the event of excess pressure occurring in the hydraulic cylinder assembly 18. Such means 218 comprises a first relief port 220 communicating with the housing bore 76 opposite from the first return port 184, a second relief port 222 communicating with the housing bore 76 opposite from the second return port 192, and a relief passageway 224 communicating the first relief port 220 with the second relief port 222. The relief means 218 also includes normally closed check valves 226 and 228 located between the respective relief ports 220 and 222 and the portions of the adjacent cylinder branches 104 and 112 communicating with the hydraulic cylinder assembly 18. The check valves 226 and 228 permit fluid under excess pressure to flow from the hydraulic cylinder assembly 18 to the returning means 180.

Manual operation means is also provided for permitting fluid to flow from the returning means 180 to the supply means 156 in the event of the shut down of the fluid pressure source 34. The manual operating means is in the form of a normally closed check valve 230 which is located between the supply branch 168 and the first return branch 204 and which permits fluid under pressure to flow from the first return branch 204 to the supply branch 168. In other embodiments, the check valve 230 can be incorporated in the fluid pressure source 34.

In the embodiment illustrated in FIG. 2, the switch valve sleeve 144 forms four piston portions 240 and includes means for permitting fluid to flow axially of the sleeve 144 in the area between the piston portions 240. Although other arrangements can be employed in other embodiments, the means for permitting fluid to flow axially of the sleeve 144 in the area between the piston portions 240 is in the form of three smaller diameter portions 248 of the sleeve 144 which connect the respective piston portions 240.

The smaller diameter portions 248 of the switch valve sleeve 144 are located so that when the switch valve 140, as shown in FIG. 2, is in a first or rightmost position, the supply port 160 communicates with the second valve port 84, the first valve port 80 communicates with the first cylinder port 88, and the second cylinder port 92 communicates with the second return port 192. And, when the valve 140, as shown in FIG. 2, is in a second or leftmost position, the supply port 160 communicates with the first valve port 80, the second valve port 84 communicates with the second cylinder port 92, and the first cylinder port 88 communicates with the first return port 184.

The hydraulic assistance device 42 also includes slave means 256 for supplying fluid to the first valve port 80 and for receiving fluid from the second valve port 84 in response to movement of the sheath 60 in the one direction relative to the core 64, and for supplying fluid to the second valve port 84 and for receiving fluid from the first valve port 80 in response to movement of the sheath 60 in the opposite direction relative to the core 64.

More particularly, the slave means 256 comprises a hydraulic cylinder 260 which, in the illustrated embodiment, is integral with the valve housing 72. The hydraulic cylinder 260 has a first end 264 in communication with the first valve port 80, and a second end 268 in communication with the second valve port 84. The slave means 256 further includes a piston rod 272 slidably received in the cylinder 260 and a ram 276 slidably received in the switch valve bore 148, connected to the core 64, and forming an extension thereof. The piston rod 272 is connected to the ram 276.

More particularly, the first end 264 of the hydraulic cylinder 260 communicates with the first valve port 80 by means of a first slave passageway 280. The second end 268 of the hydraulic cylinder 260 communicates with the second valve port 84 by means of a second slave passageway 284. The piston rod 272 is connected to the ram 276 by means of a bar 288 extending between the free end of the ram 276 and one end of the piston rod 272.

As illustrated in FIG. 2, the supply means 156 further includes means 292 for isolating the supply means 156 from the returning means 180 to prevent any leak down of the fluid pressure source 34 when the switch valve 140 is centrally located between the leftmost and rightmost positions. While other constructions can be employed in other embodiments, the isolation means 292 comprises a normally closed check valve 296 and means 300 for selectively opening the check valve 296 in response to movement of the switch valve 140 relative to the valve housing 72. More particularly, the normally closed check valve 296 is in the supply branch 168 and the means 300 for selectively opening the check valve 296 comprises a piston 304 slidably received in the supply branch 168. The piston includes means in the form of a slot 308 for allowing fluid to flow around or through the piston 304.

The piston 304 includes a rounded end 312 adjacent the smaller diameter portion 248 of the sleeve 144 connecting the two central piston portions 240 of the sleeve 144, and another end including a projection 320 adapted to engage and open the check valve 296. The rounded end 312 of the piston 304 is adjacent and movable by raised portions 324 upon the outside edges of the smaller diameter portion 248 between the central piston portions 240 of the sleeve 144. The raised portions 324 move the isolation valve piston 304 causing the projection 320 to open the check valve 286 in response to the movement of the switch valve 140 relative to the valve housing 72.

The hydraulic assistance device 42 further includes lock valve means 328 for isolating the first end 31 of the cylinder 26 from the second end 33 of the cylinder 26 in the absence of fluid under pressure in either the first cylinder conduit means 96 or the second cylinder conduit means 100. More particularly, the lock valve means 328 comprises a first normally closed check valve 332 in the first cylinder branch 104 which divides the first cylinder branch 104 into a portion communicating with the first cylinder port 88 and a portion communicating with the first cylinder conduit 108.

The lock valve means 328 also includes a second normally closed check valve 336 dividing the second cylinder branch 112 into a portion communicating with the second cylinder port 92 and a portion communicating with the second cylinder conduit 116.

The lock valve means 328 also includes means 340 responsive to fluid under pressure in the portion of the first cylinder branch 104 communicating with the first cylinder port 88 for opening the second check valve 336, and responsive to fluid under pressure in the portion of the second cylinder branch 112 communicating with the second cylinder port 92 for opening the first check valve 332. While various arrangements can be employed, in the illustrated embodiment, such means 340 comprises a control cylinder 344 which, at the opposite ends thereof, respectively communicates with the portions of the first and second cylinder branches 104 and 112 adjacent the first and second cylinder ports 88 and 92, and a piston 348 which, at the opposite ends thereof, includes projections 352 adapted to engage the first and second check valves 332 and 336 for opening thereof in response to the presence of fluid under pressure in the first and second cylinder branches 104 and 112.

Shown schematically in FIG. 3 is another marine installation 400 including a steering system 404 and the hydraulic assistance device 42. Various of the steering system components which are generally identical to the components of the steering system 14 shown in FIGS. 1 and 2 will not again be described, and are identified in the drawings by the same numerals as used with respect to the corresponding components of the system 14 shown in FIGS. 1 and 2.

As illustrated in FIG. 3, the steering system 404 differs primarily from the steering system 14 of FIGS. 1 and 2 in that the operator actuating means 38 utilizes a hydraulic arrangement 408 in lieu of the mechanical push-pull cable 54 shown in FIGS. 1 and 2. The hydraulic arrangement 408 comprises a hydraulic cylinder assembly 412 connected to the hydraulic assistance device 42, a helm 416 including a steering wheel 420, a pump 424 for pumping fluid through a first steering conduit 428 connected to one end of the cylinder assembly 412 in response to rotation of the steering wheel 420 in one direction, and for pumping fluid through a second steering conduit 432 connected to the second end of the cylinder assembly 412 in response to rotation of the steering wheel 420 in the opposite direction. The helm 416 would also normally include a fluid reservoir (not shown).

More particularly, the hydraulic cylinder assembly 412 comprises a cylinder 436 which is connected to the switch valve sleeve 144 and which slidably receives a piston rod 440 which extends from one end of the hydraulic cylinder 436. The piston rod 440 is connected to the ram 276 which (as illustrated in FIG. 2) is slidably received in the switch valve bore 148 and which is connected to the slave means piston rod 272 by bar 288.

Figure 4:
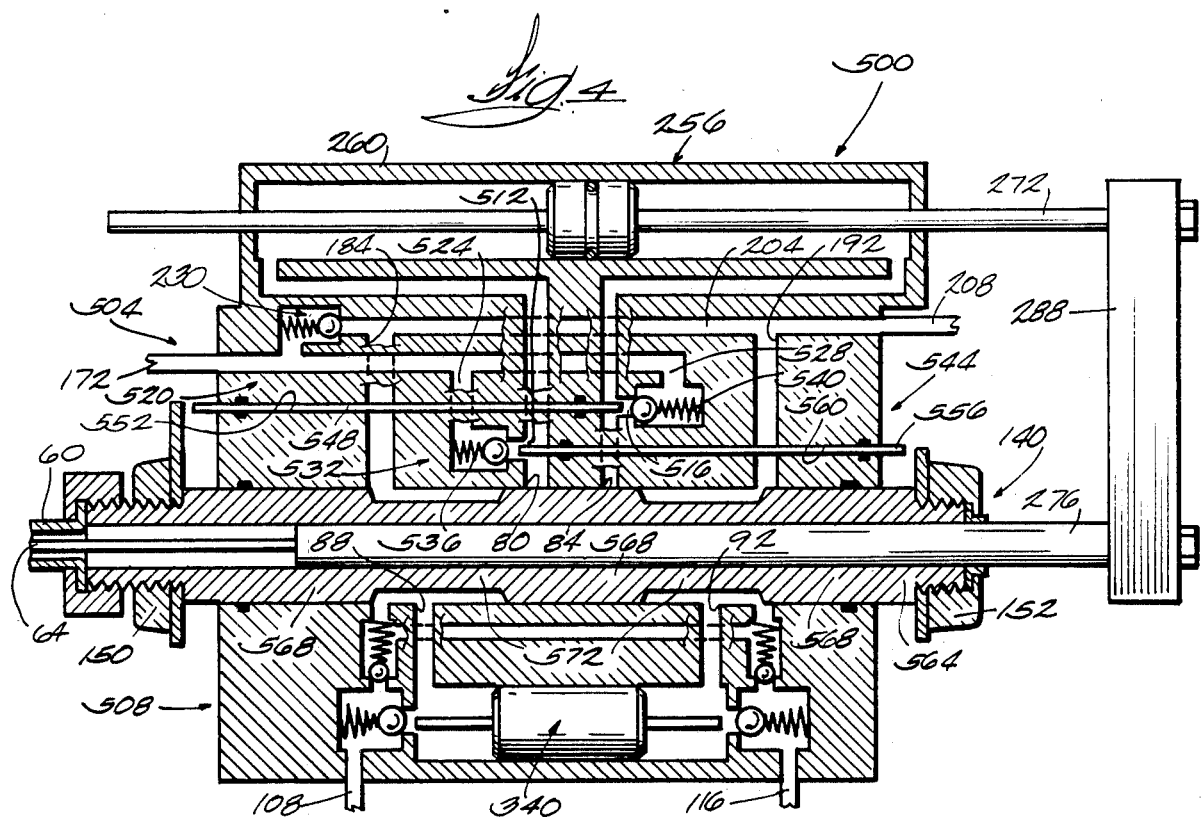
FIG. 4 is a diagramatic view of another embodiment of the hydraulic assistance device shown in FIG. 2.

Shown schematically in FIG. 4 is another hydraulic assistance device 500 for the marine installation 10 including the steering system 14 shown in FIG. 1. Various of the components of the hydraulic assistance device 500 which are generally identical to the components of the hydraulic assistance device 42 shown in FIG. 2 will not again be described and are identified in the drawings by the same numerals as used with respect to the corresponding components of the device shown in FIG. 2.

The hydraulic assistance device 500 differs primarily from the device 42 of FIGS. 1 and 2 in that the hydraulic assistance device 500 includes another embodiment 504 of the supply means 156 and another embodiment 508 of the switch valve 140.

More particularly, the supply means 504 comprises a first supply port 512 communicating with the first valve port 80, a second supply port 516 communicating with the second valve port 84, and supply conduit means 520 for supplying fluid to the supply ports 512 and 516 from the fluid pressure source 34. The supply conduit means 520 comprises a first supply branch 524 communicating with the first supply port 512, and the conduit 172. The supply conduit means 520 also includes a second supply branch 528 communicating with the second supply port 516 and with the conduit 172.

In this embodiment, the check valve 230 is between the first return branch 204 and the first supply branch 524.

The switch valve 508 is movable in response to movement of the sheath 60 relative to the core 64 for selectively supplying fluid from the supply means 504 to the second valve port 84 in response to movement of the sheath 60 in one direction relative to the core 64, and for supplying fluid from the supply means 504 to the first valve port 80 in response to movement of the sheath 60 in the opposite direction relative to the core 64. More particularly, the switch valve 508 comprises check valve means 532, sleeve 564, and the stops 150 and 152. The check valve means 532 also provides the means 292 for isolating the supply means 504 from the returning means 180 when the switch valve 508 is between the leftmost and rightmost positions.

More particularly, the check valve means 532 includes a first normally closed check valve 536 between the first supply port 512 and the first supply branch 524, and a second normally closed check valve 540 between the second supply port 516 and the second supply branch 528.

The check valve means 532 further includes means 544 for opening the second normally closed check valve 540 in response to movement of the sheath 60 relative to the core 64 in one direction, and for opening the first normally closed check valve 536 in response to movement of the sheath 60 relative to the core 64 in the opposite direction. More particularly, such opening means 544 comprises a first rod 548 slidably received in a bore 552 in the valve housing 72, disposed between the stop 150 on the switch valve sleeve 564 and the second normally closed check valve 540, and movable in response to movement of the stop 150 to open the second check valve 540. The opening means 544 also includes a second rod 556 slidably received in another bore 560 in the valve housing 72, disposed between the stop 152 on the switch valve sleeve 564 and the first normally closed check valve 536, and movable in response to movement of the stop 152 to open the first normally closed check valve 536.

Since, in this embodiment, the smaller diameter portion 248 between the central piston portions 240 of the sleeve 144 is no longer needed for selectively supplying fluid to and from the fluid pressure source 34, the sleeve 564 forms three spaced-apart piston portions 568 and includes means for permitting fluid to flow axially of the sleeve 564 in the area between the piston portions 568. Although other arrangements can be employed in other embodiments, the means for permitting fluid to flow axially of the sleeve 564 in the area between the piston portions is in the form of smaller diameter portions 572 of the sleeve 564 which connect the respective piston portions 568.

The smaller diameter portions of the switch valve sleeve 564 are located so that when the switch valve 508 shown in FIG. 4 is in a first or rightmost postion, the first valve port 80 communicates with the first cylinder port 88, and the second cylinder port 92 communicates with the second return port 192, and when the switch valve 508 shown in FIG. 5 is in a second or leftmost position, the second valve port 84 communicates with the second cylinder port 92 and the first cylinder port communicates with the first return port 184.

Various of the features of the invention are set forth in the following claims.

I claim:

1. A hydraulic assistance device for use in a steering system including a source of fluid under pressure, hydraulic steering means, a first member, and a second member movable relative to the first member, said device comprising valve means including a first valve port, and a second valve port, said valve means being adapted to communicate with the fluid pressure source and the hydraulic steering means, and adapted to be connected to the first member, and movable in response to movement of the first member relative to the second member for selectively supplying fluid from the fluid pressure source to said second valve port and for transmitting fluid to the hydraulic steering means from said first valve port in response to movement of the first member in one direction relative to the second member, and for supplying fluid from the fluid pressure source to said first valve port and for transmitting fluid to the hydraulic steering means from said second valve port in response to movement of the second member in the opposite direction relative to the first member, and slave means communicating with said first valve port and said second valve port, said slave means being adapted to be connected to the second member and movable in response to the first member relative to the second member for supplying fluid to said first valve port and for receiving fluid from said second valve port in response to movement of the first member in the one direction relative to the second member, and for supplying fluid to said second valve port and for receiving fluid from said first valve port in response to movement of the first member in the opposite direction relative to the second member.

2. A hydraulic assistance device for use in a steering system including a source of fluid under pressure, a hydraulic cylinder assembly including a hydraulic cylinder and a piston rod slidably received in said cylinder, and operator actuating means for moving the piston rod relative to the cylinder in response to operator actuation and including a first member, and a second member movable relative to the first member in response to operator actuation, said device comprising valve means including a first valve port, and a second valve port, said valve means being adapted to communicate with the fluid pressure source and the hydraulic cylinder assembly, and adapted to be connected to the first member, and movable in response to movement of the first member relative to the second member for selectively supplying fluid from the fluid pressure source to said second valve port and for transmitting fluid to the hydraulic cylinder assembly from said first valve port in response to movement of the first member in one direction relative to the second member, and for supplying fluid from the fluid pressure source to said first valve port and for transmitting fluid to the hydraulic cylinder assembly from said second valve port in response to movement of the second member in the opposite direction relative to the first member, and slave means communicating with said first valve port and said second valve port, said slave means being adapted to be connected to the second member and movable in response to movement of the first member relative to the second member for supplying fluid to said first valve port and for receiving fluid from said second valve port in response to movement of the first member in the one direction relative to the second member, and for supplying fluid to said second valve port and for receiving fluid from said first valve port in response to movement of the first member in the opposite direction relative to the second member.

3. A steering system including a source of fluid under pressure, a hydraulic cylinder assembly including a hydraulic cylinder, and a piston rod slidably received in said cylinder, operator actuating means for moving said piston rod relative to said cylinder in response to operator actuation and including a first member, and a second member movable relative to said first member in response to operator actuation, means for providing hydraulic assistance to said operator actuating means, said hydraulic assistance means comprising valve means including a first valve port, and a second valve port, said valve means communicating with said fluid pressure source and said hydraulic cylinder assembly, and connected to first member, and movable in response to movement of said first member relative to said second member for selectively supplying fluid from said fluid pressure source to said second valve port and for transmitting fluid to said hydraulic cylinder assembly from said first valve port in response to movement of said first member in one direction relative said second member, and for supplying fluid from said fluid pressure source to said first valve port and for transmitting fluid to said hydraulic cylinder assembly from said second valve port in response to movement of said second member in the opposite direction relative to the first member, and slave means communicating with said first valve port and said second valve port, and connected to said second member, and movable in response to movement of said first member relative to said second member for supplying fluid to said first valve port and receiving fluid from said second valve port in response to movement of said first member in said one direction relative to said second member, and for supplying fluid to said second valve port and receiving fluid from said first valve port in response to movement to said first member in said opposite direction relative to said second member.

4. A steering system in accordance with claim 3 wherein said hydraulic assistance means further includes means for returning fluid from said hydraulic cylinder assembly to said fluid pressure source in response to movement of said first member relative to said second member.

5. A steering system in accordance with claim 3 wherein said hydraulic cylinder includes a first end and a second end, and wherein said valve means further includes a valve housing defining a bore, and said first valve port and said second valve port are in communication with said bore, and wherein said hydraulic assistance means further includes a first cylinder port in communication with said bore, adjacent said first valve port and outside of the area between said first valve port and said second valve port, a second cylinder port in communication with said bore, adjacent said second valve port and outside of the area between said first valve port and said second valve port, first cylinder conduit means for communicating said first cylinder port with said first end of said cylinder, second cylinder conduit means for communicating said second cylinder port with said second end of said cylinder, a first return port communicating with said bore, adjacent said first cylinder port, and outside of the area between said first cylinder port and said second cylinder port, a second return port communicating with said bore, adjacent said second cylinder port, and outside of the area between said first cylinder port and said second cylinder port, first return conduit means for returning fluid from said first return port to said fluid pressure source, and second return conduit means for returning fluid from said second return port to said fluid pressure source.

6. A steering system in accordance with claim 5 wherein said valve means includes means for communicating fluid from said fluid pressure source to said first valve port and said second valve port and comprising a supply port communicating with said bore and between said first valve port and said second valve port, and supply conduit means for supplying fluid to said supply port from said fluid pressure source.

7. A steering system in accordance with claim 6 wherein said valve means further includes a switch valve slidably received in said bore and connected to said first member, said switch valve comprising four spaced-apart piston portions, and means for permitting fluid to flow in the area between said piston portions.

8. A steering system in accordance with claim 5 wherein said valve means further includes means for communicating fluid from said fluid pressure source to said first valve port and said second valve port and comprising a first supply port communicating with said first valve port, a second supply port communicating with said second valve port, and supply conduit means for supplying fluid to said first and second supply ports from said fluid pressure source.

9. A steering system in accordance with claim 8 wherein said valve means further includes a switch valve slidably received in said bore, and connected to said first member, said switch valve including three spaced apart piston portions, and means for permitting fluid to flow in the area between said piston portions, a normally closed first check valve between said fluid pressure source and said first valve port, a normally closed second check valve between said fluid pressure source and said second valve port, means for opening said normally closed second check valve in response to movement of said first member in one direction relative to said second member, and means for opening said normally closed first check valve in response to movement of said first member in the opposite direction relative to said second member.

10. A steering system in accordance with claim 5 and further including lock valve means for isolating said first end of said cylinder from said second end of said cylinder in the absence of fluid pressure in either said first cylinder conduit means or said second cylinder conduit means.

11. A steering system in accordance with claim 3 wherein said first member comprises a sheath, and wherein said second member comprises a core slidably received in said sheath.

12. A steering system in accordance with claim 3 wherein said first member is a hydraulic cylinder, and wherein said second member is a piston rod slidably received in said hydraulic cylinder.

13. A steering system in accordance with claim 3 wherein said slave means comprises a hydraulic cylinder with a first end in communication with said first valve port, and a second end in communication with said second valve port, and a piston rod slidably received in said hydraulic cylinder and connected to said second member.

14. A steering system in accordance with claim 3 wherein said valve means further includes means for isolating said fluid pressure source from said cylinder assembly when said first member is not moving relative to said second member.

15. A steering system in accordance with claim 3 and further including means communicating between said fluid pressure source and said hydraulic assistance means for supplying fluid from said fluid pressure source to said hydraulic assistance means, means communicating between said fluid pressure source and said hydraulic assistance means for returning fluid from said hydraulic assistance means to said fluid pressure source, and means communicating between said supply means and said returning means for permitting fluid under pressure to flow from said returning means to said supply means.

* * * * *